(12) United States Patent
Gao et al.

(10) Patent No.: US 12,175,869 B2
(45) Date of Patent: Dec. 24, 2024

(54) CONTROL METHOD AND RELATED DEVICE

(71) Applicant: HUAWEI TECHNOLOGIES CO., LTD., Shenzhen (CN)

(72) Inventors: Lei Gao, Beijing (CN); Luchuan Song, Shanghai (CN); Mingchao Li, Beijing (CN); Lei Wan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 17/735,290

(22) Filed: May 3, 2022

(65) Prior Publication Data

US 2022/0262247 A1 Aug. 18, 2022

Related U.S. Application Data

(63) Continuation of application No. PCT/CN2020/100025, filed on Jul. 3, 2020.

(30) Foreign Application Priority Data

Nov. 22, 2019 (CN) .......................... 201911158657.X

(51) Int. Cl.
*G08G 1/0967* (2006.01)
*B60W 60/00* (2020.01)

(52) U.S. Cl.
CPC ..... *G08G 1/096766* (2013.01); *B60W 60/001* (2020.02); *B60W 2556/45* (2020.02); *G08G 1/096708* (2013.01)

(58) Field of Classification Search
CPC ...... G08G 1/096766; G08G 1/096708; B60W 60/001; B60W 2556/45
See application file for complete search history.

(56) References Cited

U.S. PATENT DOCUMENTS 6,924,750 B2 * 8/2005 Flick ....................... B60R 25/04
342/357.57
8,577,543 B2 * 11/2013 Basir .................... G07C 5/0833
455/563

(Continued)

FOREIGN PATENT DOCUMENTS

CN 103049981 A 4/2013
CN 104661335 A 5/2015

(Continued)

*Primary Examiner* — Gertrude Arthur Jeanglaude
(74) *Attorney, Agent, or Firm* — Maier & Maier, PLLC

(57) ABSTRACT

A control method and a related device, applied to the field of autonomous driving, advanced driver assistance, or automatic control. The method includes: receiving at least one piece of first information from at least one first apparatus, where the first apparatus may include a roadside device, a network device, or a first vehicle; and determining, by a device, a first state of a second apparatus based on the received at least one piece of first information, where the second apparatus may be a vehicle light, an exterior horn, an interior signal lamp, an interior horn, an interior vibration apparatus, or the like. The first information may indicate a status such as on/off, blinking, and luminance of the vehicle light, or the interior horn plays a specific voice prompt.

20 Claims, 7 Drawing Sheets

(56) References Cited

U.S. PATENT DOCUMENTS

| | | | | |
|---|---|---|---|---|
| 8,892,301 B2* | 11/2014 | Park | ............... | B60Q 1/085 |
| | | | | 362/465 |
| 10,894,503 B2* | 1/2021 | Spero | ............... | H05B 47/115 |
| 2005/0057701 A1* | 3/2005 | Weiss | ............... | G02B 27/0101 |
| | | | | 349/10 |
| 2006/0167620 A1* | 7/2006 | Takagi | ............... | G08G 1/161 |
| | | | | 701/519 |
| 2016/0355179 A1 | 12/2016 | Cannella et al. | | |
| 2017/0358210 A1 | 12/2017 | Stewart et al. | | |
| 2019/0088148 A1 | 3/2019 | Jacobus et al. | | |
| 2019/0185018 A1 | 6/2019 | Tao et al. | | |

FOREIGN PATENT DOCUMENTS

| | | |
|---|---|---|
| CN | 105555605 A | 5/2016 |
| CN | 106114345 A | 11/2016 |
| CN | 106154834 A | 11/2016 |
| CN | 106494302 A | 3/2017 |
| CN | 107323379 A | 11/2017 |
| CN | 107719225 A | 2/2018 |
| CN | 107878303 A | 4/2018 |
| CN | 108237967 A | 7/2018 |
| CN | 108394338 A | 8/2018 |
| CN | 109249853 A | 1/2019 |
| CN | 110246333 A | 9/2019 |
| EP | 2594431 A2 | 5/2013 |
| WO | 2019180700 A1 | 9/2019 |

* cited by examiner

CONTROL METHOD AND RELATED DEVICE

CROSS-REFERENCE TO RELATED APPLICATIONS

This application is a continuation of International Application No. PCT/CN2020/100025, filed on Jul. 3, 2020, which claims priority to Chinese Patent Application No. 201911158657.X, filed on Nov. 22, 2019. The disclosures of the aforementioned applications are hereby incorporated by reference in their entireties.

TECHNICAL FIELD

The embodiments relate to the field of automatic control, and in particular, to a control method and a related device.

BACKGROUND

With the development of intelligent technologies, people have increasingly high requirements for intelligent systems. Vehicles are indispensable means of transportation for people's production and life. Safety performance of the vehicles affects quality of production and life and is also directly related to safety. Exterior illuminating and signal devices, such as vehicle lights and horns, usually rely on manual operations of drivers. Because a vehicle light system involves a relatively large quantity of lamps, a pure manual operation requires a relatively large quantity of buttons. Once an incorrect operation occurs, an accident is prone to occur.

Existing automatic control of the exterior illuminating and signal device is mainly based on ego vehicle sensing. The following uses exterior light control that is based on ego vehicle sensing as an example. Sensing information is from sensors mounted on vehicles, and an automatic control system of a vehicle light status automatically controls vehicle lights based on ego vehicle sensing information. For example, one of the sensors includes a light luminance sensor that can automatically monitor a change of light outside the vehicle. After the sensor detects that ambient light outside the vehicle becomes dark, low beam headlamps of the vehicle are automatically turned on. This requires no manual operation of a driver. Because a light system is controlled based on ego vehicle sensing, the control of the light system is triggered only after an ambient environment meets a specific condition. When an environmental condition, especially a light condition, changes greatly, the light system cannot be controlled in advance to avoid a case that the driver cannot adapt to a rapid change of the environment, or even has "instant blindness". For example, during the day, when the vehicle enters a tunnel, the light suddenly changes from bright to dark. However, after the light luminance sensor mounted on the vehicle senses the light luminance change, the light luminance sensor sends indication information to indicate the vehicle to automatically enable the light control system. The light system of the vehicle is not enabled during a time after entering the tunnel and before the light control system operates, so that the driver has "instant blindness". Because light enabling is retarded, it is not conducive to observe road conditions in the tunnel, and consequently a traffic accident is prone to occur.

When a pedestrian, a vehicle, a local road condition, a traffic sign, and the like are difficult to be observed or clearly observed due to poor light or poor lighting conditions in a local area, a sensor, especially a visual sensor, of a vehicle is usually unable to obtain or recognize these situations. Consequently, a light status cannot be adjusted based on the information. Therefore, how to resolve a problem that a second apparatus is not controlled in time or even cannot be properly controlled due to a limited ego vehicle sensing capability and range when the second apparatus (for example, a vehicle light apparatus) is controlled based on ego vehicle sensing is a problem being studied by persons skilled in the art.

SUMMARY

According to embodiments, a control method and a related device are provided, and may be applied to the field of autonomous driving (AD), advanced driver assistance system (ADAS), automatic control, or intelligent driving. This implements automatic control of at least one second apparatus (for example, a vehicle light apparatus), and resolves a problem that an automatic control function of the second apparatus is limited by a sensing range.

According to a first aspect, an embodiment provides a control method, and the method may include:

receiving at least one piece of first information from at least one first apparatus, where the at least one first apparatus includes at least one of a roadside device, a network device, and a first vehicle; and determining a first state of at least one second apparatus based on the at least one piece of first information.

In this embodiment, a device first receives the at least one piece of first information from the at least one first apparatus. The first apparatus may include the roadside device, the network device, or the first vehicle. The device determines the first state of the second apparatus based on the received at least one piece of first information. The second apparatus may be at least one of an exterior illuminating and signal device such as a vehicle light or a horn. The first information may indicate at least one of a status such as on/off, blinking, luminance, and the like of the vehicle light, and may indicate honking of the exterior horn, prompt content of an interior prompt tone, and the like. The first state may provide information (for example, a voice prompt of a road condition) to a driver or direct the driver's attention (for example, steering wheel vibration prompts to hold a steering wheel, or flashing high beams to illuminate a traffic sign), to assist the driver to properly drive the vehicle. In this implementation, different states of a plurality of second apparatuses are determined by using the first information from the roadside device, the network device, or the first vehicle, so that the second apparatus can be automatically controlled, and a problem that based on ego vehicle sensing, an automatic control function of the second apparatus is limited by a sensing range is resolved. At the same time, because a state of the at least one second apparatus is controlled to change, the at least one second apparatus may also extend a sensing range and capability of a sensor of the vehicle and/or the driver, for example, turning on the light may enable the driver and a visual sensor to observe an area that cannot be seen when the light is not turned on, and also has a function of prompting another vehicle sensor and another driver of existence of the vehicle and a location of the vehicle.

In a possible implementation, the method further includes: sending control information to the at least one second apparatus, where the control information is used to indicate the first state of the at least one second apparatus. In this implementation, after determining the first state of the at least one second apparatus, the device directly sends the control information to the at least one second apparatus, so as to control the at least one second apparatus to reach the first state. This implements automatic control of the vehicle lights and resolves a problem that based on ego vehicle sensing, an automatic control function of the vehicle lights is limited by a sensing range.

In a possible implementation, the method further includes: sending control information to at least one third apparatus, where the control information is used to indicate the first state of the at least one second apparatus. This implementation describes a case in which the device may further send the control information to the third apparatus. When the device is a central controller or a control node, the third apparatus may be a controller that directly controls the at least one second apparatus, so as to control the at least one second apparatus to reach the first state. This implements automatic control of the at least one second apparatus (for example, a vehicle light apparatus), and resolves a problem that based on ego vehicle sensing, an automatic control function of the at least one second apparatus is limited by a sensing range.

In a possible implementation, there is a correspondence between the at least one piece of first information and the first state of the at least one second apparatus, and the correspondence is preset. In this implementation, a correspondence between an indication message and the first state is preset, and the corresponding first state is determined by using the obtained indication message. This implements automatic control of the at least one second apparatus and improves efficiency.

In a possible implementation, the determining a first state of at least one second apparatus based on the at least one piece of first information includes: determining the first state of the at least one second apparatus based on the at least one piece of first information and second information, where the second information is from a terminal including the at least one second apparatus. In this implementation, the first state of the at least one second apparatus is determined by combining the first information and the second information. The terminal is a carrier device, namely, a vehicle, of the at least one second apparatus. A state of the at least one second apparatus is comprehensively determined by using an operating status of the vehicle, so that a proper state of the at least one second apparatus can be more accurately determined.

In a possible implementation, the second information includes operating status information of the terminal, and the operating status information includes at least one of a motion status, a network status, a component operating status, and current location information.

In a possible implementation, information included in the second information is determined by using at least one sensor and/or an element status inside the terminal. In this implementation, the operating status information of the terminal may be obtained by using the sensor or the element status inside the terminal, including information such as a speed and a temperature.

In a possible implementation, the second apparatus includes at least one of the following: an exterior illuminating lamp apparatus; an exterior signal lamp apparatus; an interior illuminating apparatus; an interior active noise cancellation apparatus; an interior visual cue apparatus; an interior auditory cue apparatus; and an interior tactile cue apparatus. This implementation provides a plurality of types of the second apparatus, and the first state of the at least one second apparatus is determined by using the at least one piece of first information. This implements automatic control of the state of the at least one second apparatus.

In a possible implementation, the at least one piece of first information includes environment information and/or status first information. The environment information includes at least one of the following: road information; light luminance information; weather information; pedestrian information; map information; vehicle information; and traffic sign information. The status first information is used to indicate the first state of the at least one second apparatus. This implementation provides a plurality of types of the first information, and the first state of the at least one second apparatus is determined by using a plurality of different types of the first information, so that a proper state of the at least one second apparatus can be more accurately determined. This implements automatic control of the vehicle lights and improves efficiency.

In a possible implementation, the light luminance information belongs to a first luminance range in a plurality of light luminance ranges, the plurality of light luminance ranges is defined by using at least one threshold, and the plurality of light luminance ranges corresponds with a light status of the second apparatus. The determining a first state of at least one second apparatus based on the at least one piece of first information includes: if the light luminance information in the at least one piece of first information falls within the first luminance range, determining the light status of the second apparatus based on the at least one piece of first information, so that the light status of the second apparatus corresponds to the first luminance range. In this implementation, a correspondence between the plurality of light luminance ranges and light luminance of the second apparatus is preset, and different light statuses are preset based on obtained different light luminance of an environment, so that when the light luminance is insufficient or very strong, the light status does not need to be manually adjusted.

In a possible implementation, the at least one threshold is predefined or preset. In this implementation, the at least one threshold is preset to determine the plurality of light luminance ranges, so as to determine a range in which the light luminance information falls in the plurality of light luminance ranges and determine light luminance of the at least one second apparatus.

In a possible implementation, the determining a first state of at least one second apparatus based on the at least one piece of first information includes: determining, based on the at least one piece of first information, that the at least one second apparatus is in the first state when a first condition is met. This implementation provides a delay control manner. For example, the at least one second apparatus may be in the first state only when the first condition is met, and the first condition may be a time condition or a space condition. This more conveniently implements control of the at least one second apparatus and improves efficiency.

In a possible implementation, the sending control information to the at least one second apparatus, where the control information is used to indicate the first state of the at least one second apparatus includes: sending at least one piece of control information to the at least one second apparatus when a first condition is met. This implementation provides a delay control manner. For example, the device sends the control information to the at least one second apparatus only when the first condition is met, and the first condition may be a time condition or a space condition. This more conveniently implements control of the at least one second apparatus and improves efficiency.

In a possible implementation, the sending control information to at least one third apparatus, where the control information is used to indicate the first state of the at least one second apparatus includes: sending at least one piece of control information to the at least one third apparatus when a first condition is met. This implementation provides a delay control manner. For example, the device sends the control information to the third apparatus only when the first condition is met, and the first condition may be a time condition or a space condition. This more conveniently implements control of the at least one second apparatus and improves efficiency.

According to a second aspect, an embodiment provides another control method, applied to a first apparatus, and the method includes: sending status indication information to a terminal, where the status indication information is used to indicate a first state of at least one second apparatus. The first apparatus includes a roadside device, a network device, or a first vehicle, and the terminal includes the at least one second apparatus.

In this embodiment, the first apparatus sends the status indication information to the terminal, to indicate the first state of the at least one second apparatus of the terminal. The at least one second apparatus may be an exterior illuminating and signal device such as a vehicle light or a horn. The status indication information may indicate a status such as on/off, blinking, luminance, and the like of the vehicle light. In this implementation, different statuses of a plurality of vehicle lights are determined by using the status indication information sent by the roadside device, the network device, or the first vehicle. This can implement automatic control of the at least one second apparatus and resolve a problem that based on ego vehicle sensing, an automatic control function of the at least one second apparatus is limited by a sensing range.

In a possible implementation, before the sending status indication information to a terminal, the method further includes: determining the status indication information based on obtained environment information. The environment information includes at least one of road information, light luminance information, weather information, pedestrian information, map information, vehicle information, and traffic sign information. In this implementation, the first apparatus obtains the environment information to determine the status indication information, so as to indicate the first state of the at least one second apparatus of the terminal. This can implement automatic control of the at least one second apparatus and resolve the problem that based on ego vehicle sensing, the automatic control function of the at least one second apparatus is limited by the sensing range.

According to a third aspect, an embodiment provides a control apparatus, including:
  a receiving unit, configured to receive at least one piece of first information from at least one first apparatus, where the at least one first apparatus includes at least one of a roadside device, a network device, and a second apparatus; and
  a first processing unit, configured to determine a first state of at least one second apparatus based on the at least one piece of first information.

The control apparatus in this embodiment first receives the at least one piece of first information from the at least one first apparatus by using the receiving unit, where the first apparatus may include the roadside device, the network device, or a first vehicle; and then determines the first state of the second apparatus by using a processing unit based on the received at least one piece of first information. The second apparatus may be a vehicle light, and the first information may indicate a status such as on/off, blinking, luminance, and the like of the vehicle light. In this implementation, different states of the at least one second apparatus are determined by using the first information from the roadside device, the network device, or the first vehicle. This can implement automatic control of the at least one second apparatus and resolve a problem that based on ego vehicle sensing, an automatic control function of the at least one second apparatus is limited by a sensing range.

In a possible implementation, the apparatus further includes: a first sending unit, configured to send control information to the at least one second apparatus, where the control information is used to indicate the first state of the at least one second apparatus.

In a possible implementation, the apparatus further includes: the first sending unit, further configured to send control information to at least one third apparatus, where the control information is used to indicate the first state of the at least one second apparatus.

In a possible implementation, there is a correspondence between the at least one piece of first information and the first state of the at least one second apparatus, and the correspondence is preset.

In a possible implementation, the first processing unit is configured to determine the first state of the at least one second apparatus based on the at least one piece of first information and second information. The second information is from a terminal including the at least one second apparatus.

In a possible implementation, the second information includes operating status information of the terminal, and the operating status information includes at least one of a motion status, a network status, a component operating status, and current location information.

In a possible implementation, information included in the operating status information is determined by using at least one sensor and/or an element status inside the terminal.

In a possible implementation, the second apparatus includes at least one of the following: an exterior illuminating lamp apparatus; an exterior signal lamp apparatus; an interior illuminating apparatus; an interior active noise cancellation apparatus; an interior visual cue apparatus; an interior auditory cue apparatus; and an interior tactile cue apparatus.

In a possible implementation, the at least one piece of first information includes environment information and/or status first information. The environment information includes at least one of the following: road information; light luminance information; weather information; pedestrian information; map information; vehicle information; and traffic sign information. The status first information is used to indicate the first state of the at least one second apparatus.

In a possible implementation, the light luminance information belongs to a first luminance range in a plurality of light luminance ranges, the plurality of light luminance ranges is defined by using at least one threshold, and the plurality of light luminance ranges corresponds with a light status of the second apparatus. The first processing unit is configured to: if the light luminance information in the at least one piece of first information falls within the first luminance range, determine the light status of the second apparatus based on the at least one piece of first information, so that the light status of the second apparatus corresponds to the first luminance range.

In a possible implementation, the at least one threshold is predefined or preset.

In a possible implementation, the first processing unit is configured to determine, based on the at least one piece of first information, that the at least one second apparatus is in the first state when a first condition is met.

In a possible implementation, the first sending unit is configured to send at least one piece of control information to the at least one second apparatus when the first condition is met.

In a possible implementation, the first sending unit is configured to send at least one piece of control information to at least one third apparatus when the first condition is met.

According to a fourth aspect, an embodiment provides a control apparatus, including: a second sending unit, configured to send status indication information to a terminal, where the status indication information is used to indicate a first state of at least one second apparatus. A first apparatus includes a roadside device, a network device, or a first vehicle, and the terminal includes the at least one second apparatus.

In a possible implementation, the apparatus further includes: a second processing unit, configured to: before sending the status indication information to the terminal, determine the status indication information based on obtained environment information. The environment information includes at least one of road information, light luminance information, weather information, pedestrian information, map information, vehicle information, and traffic sign information.

According to a fifth aspect, an embodiment provides an electronic device. The electronic device includes at least one processor, and the processor is configured to support the electronic device in implementing a corresponding function in the control method provided in the first aspect or the second aspect. The electronic device may further include a memory. The memory is configured to be coupled to the processor, and the memory stores program instructions and data that are necessary for the electronic device. The electronic device may further include a communications interface, used for communication between the electronic device and another device or a communications network.

In a possible implementation, the electronic device is powered by using a battery.

According to a sixth aspect, an embodiment provides a computer-readable storage medium, configured to store computer software instructions used by the control apparatus provided in the third aspect or the fourth aspect. The computer-readable storage medium includes a program designed for executing the foregoing aspects.

According to a seventh aspect, an embodiment provides a computer program. The computer program includes instructions, and when the computer program is executed by a computer, the computer is enabled to perform the procedure performed by the control apparatus in the third aspect or the fourth aspect.

According to an eighth aspect, a chip system includes at least one processor and an interface circuit, the interface circuit provides program instructions for the at least one processor, and when the program instructions are executed by the at least one processor, the at least one processor is configured to support an electronic device in implementing the functions in the first aspect or the second aspect, for example, generating or processing information in the control method. In a possible implementation, the chip system further includes a memory. The memory is configured to store program instructions and data that are necessary for a data sending device. The chip system may include a chip or may include a chip and another discrete component.

BRIEF DESCRIPTION OF DRAWINGS

To describe the solutions in the embodiments or in the background more clearly, the following describes the accompanying drawings for describing the embodiments or the background.

DETAILED DESCRIPTION OF THE EMBODIMENTS

Figure 1:
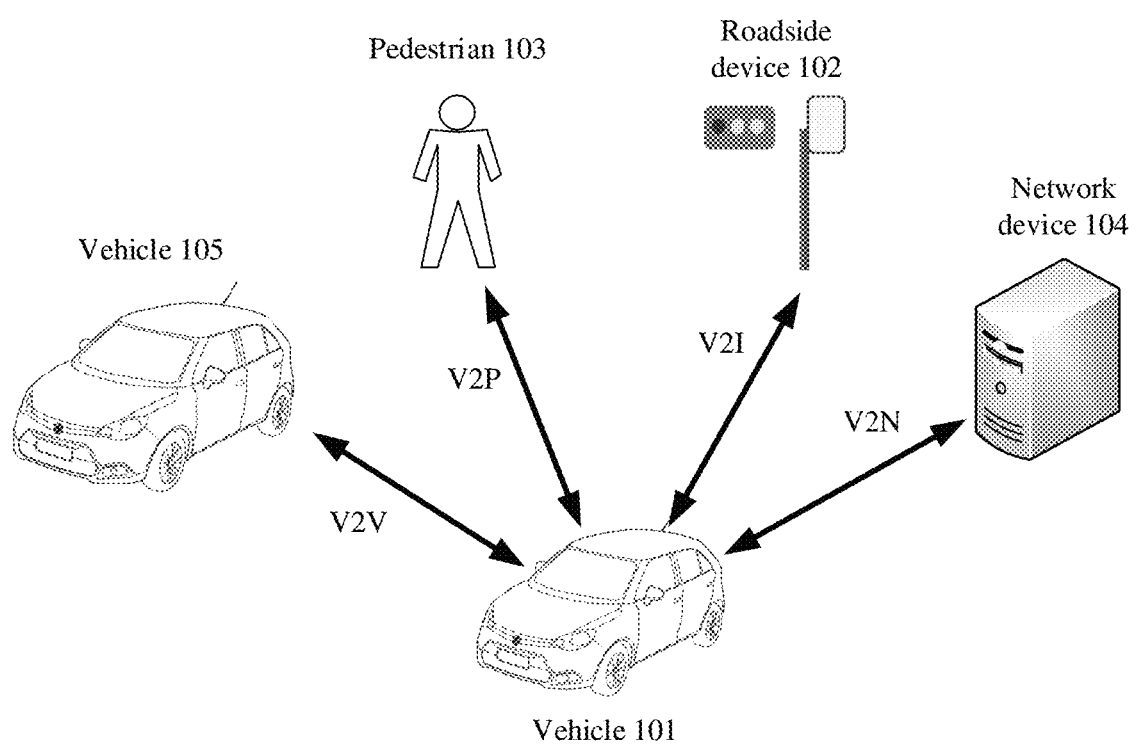
FIG. 1 is a schematic diagram of a system architecture of a control method according to an embodiment.

The following describes the embodiments with reference to the accompanying drawings.

In the embodiments and accompanying drawings, the terms "first", "second", "third", "fourth" and the like are intended to distinguish between different objects but do not indicate a particular order. In addition, the terms "include", "have", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

Mentioning an "embodiment" means that a particular characteristic, structure, or feature described with reference to the embodiment may be included in at least one embodiment. The phrase shown in various locations herein may not necessarily refer to a same embodiment and is not an independent or optional embodiment exclusive from another embodiment. It is explicitly and implicitly understood by persons skilled in the art that the embodiments described may be combined with another embodiment.

The terms such as "component", "module", and "system" are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both an application that runs on a computing device and the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across networks such as an internet interacting with another system by using the signal).

Some terms are first described, so as to help persons skilled in the art have a better understanding.

(1) V2X: Vehicle to everything, an internet of vehicles wireless communications technology, which is a technology used for communication of vehicle to vehicle (V2V), vehicle to infrastructure (V2I), vehicle to pedestrian (V2P), and vehicle to network (V2N), that is, information exchange between a vehicle and the outside. By integrating a global positioning system (GPS) navigation technology, a vehicle-to-vehicle communications technology, a wireless communications technology, and a remote sensing technology, the internet of vehicles lays a foundation for a development trend of new vehicle technologies and implements compatibility between manual driving and autonomous driving. The internet of vehicles implements communication of vehicle to vehicle, vehicle to base station, and base station to base station. In this way, a series of traffic information such as a real-time road condition, road information, and pedestrian information can be obtained. This improves driving safety, reduces congestion, improves traffic efficiency, provides in-vehicle infotainment information, and the like. In addition, an on-board sensor and a camera system can be used to sense an ambient environment, so as to make a quick adjustment and achieve "zero traffic accident". For example, if a pedestrian suddenly appears, the vehicle can automatically slow down to a safe speed or stop.

(2) Roadside device: The roadside device is also referred to as a roadside facility or a roadside unit, may include a roadside end, a signal lamp, a traffic sign, an intelligent facility, and the like, and can quickly integrate and distribute information flows for sensing fragmented information of various devices and vehicles to a corresponding control node and vehicle to provide a service.

(3) Vehicle light: The exterior of the vehicle includes headlamps (high and low beams), side marker lamps, fog lamps, daytime running lamps, and turn signals. The headlamps are used to provide road illuminating at night. Generally, low beam headlamps are used when outside light is sufficient or traffic is heavy, and high beam headlamps are used when the road is dark at night and traffic is light. The high beam headlamps are turned off and the low beam headlamps are used for illumination when there is an oncoming vehicle on the opposite or a vehicle in the front. The side marker lamps are small lamps on the front and rear (which are also called evening running lamps and are turned on when it is not completely dark, and a next gear of the side marker lamps is turning on the headlamps). The side marker lamps indicate a width of the vehicle to prompt the vehicle on the opposite or a vehicle in the back. The side marker lamps are used to make the vehicle visible to other vehicles when traveling in the evening. The fog lamps generally indicate automotive fog lamps, are mounted on the front and rear of the vehicle and are used to illuminate the road when traveling in rainy and foggy weather. The daytime running lamps refer to lamps that make the vehicle more easily to be recognized when the vehicle travels during the day and are mounted on the front of the vehicle. In other words, the lamps are not illuminating lamps, are not to enable a driver to see the road clearly, but to let others know that a vehicle is coming and belong to a category of signal lamps. The turn signals are important indicators that are turned on to prompt vehicles and pedestrians in the front, rear, left, and right when a motor vehicle turns. A turn signal tube adopts a xenon lamp tube and a single-chip control circuit and left and right alternate strobes work uninterruptedly. The turn signals adopt a flasher to implement light flashing. The turn signals can be divided into three types: a resistance wire type, a capacitive type, and an electronic type.

(4) Vehicle dashboard: The vehicle dashboard is an apparatus that reflects an operating condition of each system of the vehicle, and commonly includes a fuel indicator, a clean liquid indicator, an electronic accelerator indicator, a front and rear fog lamp indicator, and a warning lamp. In this embodiment, the vehicle light may further include various indicators on the vehicle dashboard.

In addition, to facilitate understanding of the embodiments, the following analyzes problems that need to be resolved in the embodiments and corresponding application scenarios. For example, in a process of performing vehicle light control, lights are automatically controlled based on ego vehicle sensing in most cases. Sensing information is from a sensor mounted on the vehicle, and an automatic control system of a vehicle light status automatically controls the vehicle lights based on sensing information of the vehicle. For example, one of the sensors includes a light luminance sensor that can automatically monitor a change of light outside the vehicle. After detecting that ambient light outside the vehicle becomes dark, the sensor automatically turns on low beam headlamps of the vehicle. This requires no manual operation of a driver. However, a light control system based on ego vehicle sensing has a problem of an operation latency. This is prone to bring safety risks to driving. For example, during the day, when the vehicle enters a tunnel, the light suddenly changes from bright to dark. However, after the light luminance sensor mounted on the vehicle senses the light luminance change, the light luminance sensor sends first information to indicate the vehicle to automatically enable the light control system. The light system of the vehicle is not enabled during a time after entering the tunnel and before the light control system operates, so that the driver has "instant blindness". Because light enabling is retarded, it is not conducive to observe road conditions in the tunnel, and consequently a traffic accident is prone to occur.

Based on the foregoing problems and the corresponding application scenarios, for ease of understanding of this embodiment, the following first describes one system architecture in this embodiment. FIG. 1 is a schematic diagram of a system architecture according to this embodiment. A first apparatus may include a roadside device 102, a pedestrian 103, a network device 104, and a vehicle 105 in FIG. 1. A second apparatus may include a light module, a sound module, a safety module, and the like of a vehicle 101. The vehicle 101 includes at least a communications module, a control module, and at least one second apparatus. This embodiment may be executed by the vehicle 101 or the control module in the vehicle 101.

The vehicle 101 receives, by using the communications module, at least one piece of first information sent by at least one first apparatus. Then, the control module determines an operating status of the at least one second apparatus based on the first information and performs corresponding control on the at least one second apparatus.

The roadside device 102 is also referred to as a roadside unit and is configured to obtain information such as a road condition, a pedestrian, and traffic. A vehicle may use the roadside unit to access data stored in the roadside unit or upload data of the vehicle. The roadside unit collects vehicle safety information sent by an on board unit and forwards the vehicle safety information to a road monitoring center. After summarizing safety information of each vehicle, the road monitoring center can monitor a road condition of the entire road and a running status of each vehicle. In addition, after receiving the road safety information sent by the road monitoring center, the roadside unit broadcasts the road safety information to vehicles on the road. The roadside unit uses the same mobile communications technology as the on board unit and needs to communicate with the road monitoring center. In terms of function and structure, the roadside unit may be considered as a gateway in a heterogeneous network.

The network device 104 includes various forms of network devices, such as a server, a macro base station, a micro base station (also referred to as a small cell), a relay station, and an access point. The server may include but is not limited to a cloud server, a background server, a component server, a data processing server, and the like. The server may communicate with a plurality of terminals through the internet. A server-side program needs to run on the server to provide a corresponding service, such as a database service, data calculation, or decision execution. The base station may be a base transceiver station (BTS) in a time division synchronous code division multiple access (TD-SCDMA) system, or may be an evolved NodeB (eNB) in a long term evolution (LTE) system and a gNB in a 5G system and a new radio (NR) system. In addition, the base station may alternatively be a transmission reception point (TRP), a central unit (CU), or another network entity. In addition, in a scenario of a distributed base station, the network device may be a baseband unit (BBU) and a remote radio unit (RRU); and in a scenario of a cloud radio access network (CRAN), the network device may be a baseband pool BBU pool and a radio frequency unit RRU.

The vehicle 105 sends vehicle information of the vehicle 105 to the vehicle 101 through the communications module, so that the vehicle 101 comprehensively determines, by using the control module, the operating status of the at least one second apparatus based on the vehicle information and performs corresponding control on the at least one second apparatus.

It may be understood that the system architecture in FIG. 1 is only an example implementation in this embodiment, and the system in this embodiment includes but is not limited to the foregoing system architecture. With reference to a control system architecture, the following uses two scenarios to which the control method is applied as an example.

Figure 2:
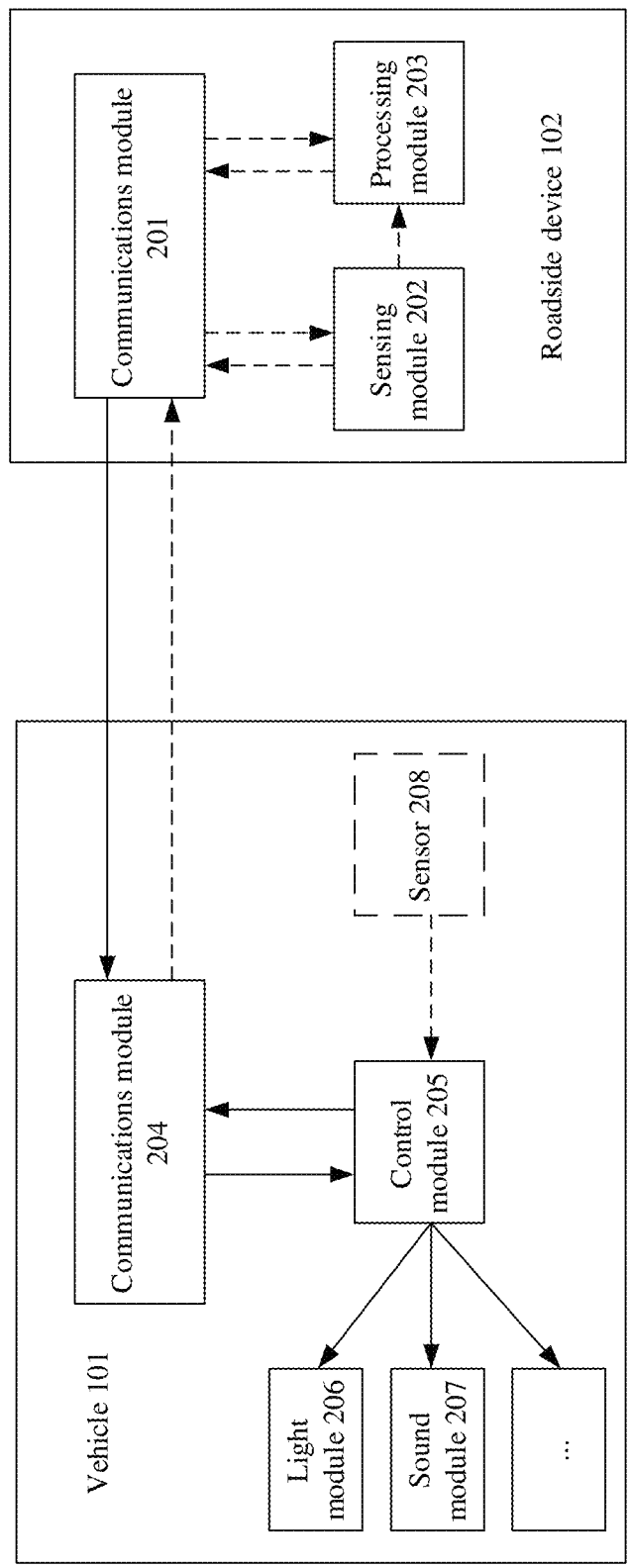
FIG. 2 is a schematic diagram of an application scenario of a control method according to an embodiment.

Scenario 1: A communication scenario between a vehicle and a roadside device. As shown in FIG. 2, a first apparatus is the roadside device 102, and a second apparatus is a light module 206, a sound module 207, and the like of the vehicle 101. The roadside device 102 includes at least a communications module 201. Optionally, the roadside device 102 may further include a sensing module 202 and a processing module 203. The communications module 201 is configured to send and receive information. The roadside device 102 sends at least one piece of first information to the vehicle 101 through the communications module 201, and may further receive, through the communications module 201, road information, vehicle information, weather information, and the like that are sent by another apparatus, including latest road information (for example, construction information or traffic accident information) sent by the network device 104 to the roadside device 102, and vehicle information sent by another vehicle to the roadside device 102 (for example, a traveling speed of the vehicle, a traveling location, or a light status). The sensing module 202 may include light sensing, temperature sensing, humidity sensing, distance sensing, and the like. The roadside device 102 may obtain ambient light information, weather information, pedestrian information, vehicle information, and the like through the sensing module 202. The processing module 203 is configured to comprehensively process the information obtained by the communications module 201 and the sensing module 202, to obtain a final processing result, and then send, through the communications module 201, first information corresponding to the processing result to the vehicle 101.

The vehicle 101 may include a communications module 204, a control module 205, a light module 206, and a sound module 207. Optionally, the vehicle 101 may further include at least one sensor 208. The communications module 204 is configured to send and receive information. The vehicle 101 receives, through the communications module 204, the at least one piece of first information sent by the at least one roadside device 102, or may send vehicle information (for example, a traveling speed of the vehicle, a traveling location, or a light status) of the vehicle 101 through the communications module 204 to the roadside device 102 or another device (for example, a network device, or another vehicle).

The control module 205 is configured to comprehensively determine a control manner for the at least one second apparatus (the light module 206 and/or the sound module 207) based on the at least one piece of first information, and then control the light module 206 and/or the sound module 207. The control module 205 may be a direct control apparatus of the light module 206 and/or the sound module 207 or may be a central controller or a control node of the vehicle 101. The central controller sends control instructions to the direct control apparatus of the light module 206 and/or the sound module 207. The direct control apparatus then controls the light module 206 and/or the sound module 207.

The light module 206 may refer to all lights on the vehicle 101 (for example, headlamps, side marker lamps, fog lamps, daytime running lamps, and turn signals outside the vehicle, and illuminating lamps and signal lamps in the vehicle) and may also refer to each individual light on the vehicle 101. When the light module 206 refers to each individual light on the vehicle 101, the vehicle 101 has a plurality of light modules 206. The sound module 207 may refer to all sound apparatuses on the vehicle 101 (for example, an exterior horn, an interior stereo, or a radio), and may also refer to each individual sound apparatus on the vehicle 101. When the sound module 207 refers to each individual sound apparatus on the vehicle 101, the vehicle 101 has a plurality of sound modules 207.

The at least one sensor 208 is a detection apparatus and is configured to measure information and convert the measured information into an electrical signal or information in another required form for output, to meet requirements for information transmission, processing, storage, display, record, and control. Generally, the sensor 208 includes a sensitive element (for example, a thermosensitive element, a photosensitive element, a force sensitive element, a magnetic sensitive element, a humidity sensitive element, an acoustic sensitive element, or a radiation sensitive element) and a conversion element, may include at least one of a light sensor, a temperature sensor, a humidity sensor, a distance sensor, a mileage sensor, a radar, and the like, The control module 205 may comprehensively determine a control manner for the at least one second apparatus (the light module 206 and/or the sound module 207) by using the at least one piece of first information received through the communications module 204 and information obtained through the sensor 208, and then control the at least one second apparatus.

Figure 3:
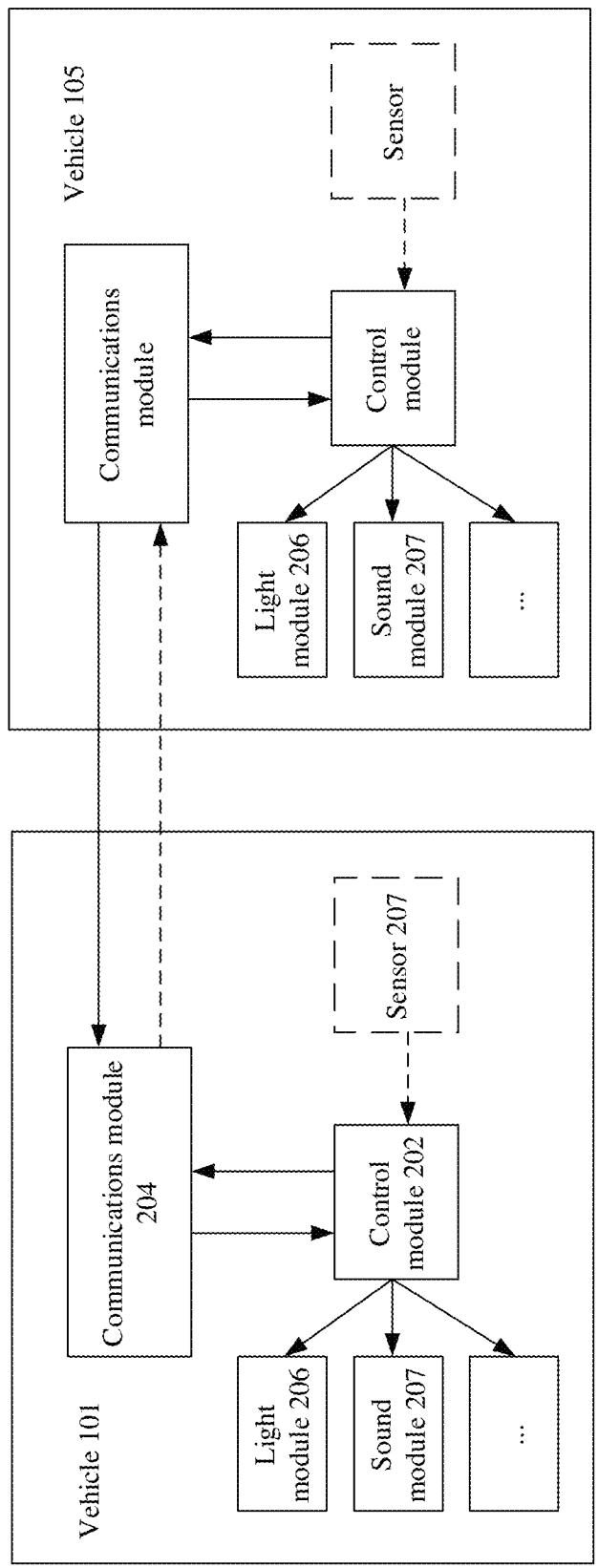
FIG. 3 is a schematic diagram of an application scenario of another control method according to an embodiment.

Scenario 2: A vehicle-to-vehicle communication scenario. As shown in FIG. 3, a first apparatus is the vehicle 105, and a second apparatus is the light module 206, the sound module 207, and the like of the vehicle 101. The communications module 204 of the vehicle 101 receives at least one piece of first information sent by the vehicle 105, or may send the vehicle information (for example, the traveling speed of the vehicle, the traveling location, or the light status) of the vehicle 101 through the communications module 204 to the vehicle 105. For specific descriptions of the vehicle 105 and the vehicle 101, refer to descriptions of the vehicle 101 in the foregoing scenario 1. Details are not described herein again. In the vehicle-to-vehicle communication scenario, vehicles may communicate with each other through a side link (SL). The SL communication is direct communication between the vehicles. In other words, the vehicles directly communicate with each other without forwarding data through the network device. Vehicle to network communication uses an uplink and a downlink. The uplink and the downlink are defined for a Uu interface for communication between a network device and a user. Transmission from the network device to the user is downlink (DL) transmission, and transmission from the user to the network device is uplink (UL) transmission.

It should be noted that the control system architecture shown in FIG. 1 is only intended to describe the embodiments, but is not intended to limit. Persons of ordinary skill in the art may know that as a network architecture evolves and a new service scenario emerges, the embodiments are also applicable to a similar problem.

Figure 4:
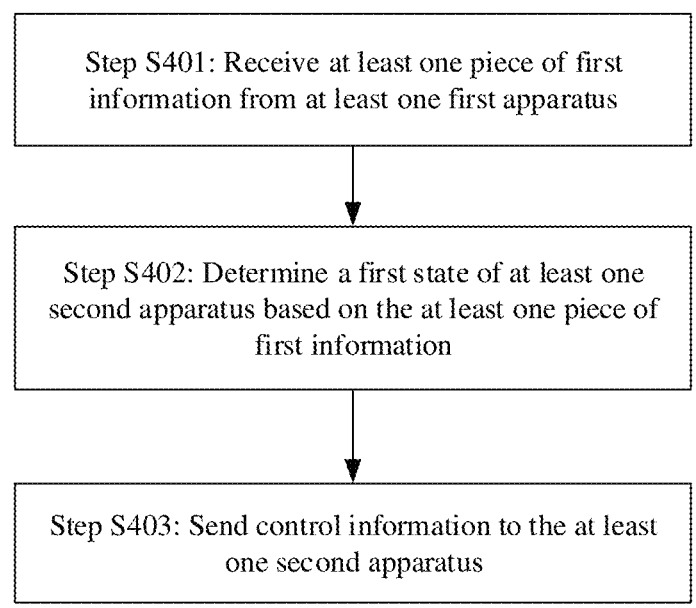
FIG. 4 is a schematic flowchart of a control method according to an embodiment.

Based on the foregoing control system and an application scenario, an embodiment provides a control method. FIG. 4 is a schematic flowchart of the control method according to this embodiment. The control module 205 of the vehicle 101 is used as an execution body. The method includes but is not limited to the following steps.

Step S401: Receive at least one piece of first information from at least one first apparatus.

For example, the control module 205 receives the at least one piece of first information from the at least one first apparatus. The at least one first apparatus includes at least one of a roadside device (such as a signal lamp or a traffic sign), a network device (such as a cloud server or a base station), and a first vehicle. The first vehicle may be another vehicle (for example, the vehicle 105) other than the vehicle 101. The at least one piece of first information sent by the at least one first apparatus may be pre-generated or stored by the first apparatus or may be obtained through processing based on sensing information obtained by the first apparatus. A sending manner of the at least one piece of first information may be unicast, multicast, or broadcast. This is not limited herein.

The at least one piece of first information includes environment information and/or status indication information. The environment information may include at least one of the following: road information, for example, whether a road is congested, a road turning radius, and whether a traffic accident occurs; light luminance information, that is, luminance information of an environment; weather information, for example, air humidity information, whether there is fog, and whether there is rain; pedestrian information, for example, information such as whether there is a pedestrian within a preset range from the vehicle and a quantity of pedestrians; map information, for example, a tunnel and a steep slope; vehicle information, for example, information such as a quantity, location, and traveling speed of another vehicle; and traffic sign information, for example, a location of a roadside traffic sign or traffic indication information. The status indication information is used to indicate a first state of at least one second apparatus. The second apparatus includes the light module 206 of the vehicle 101 and may further include an apparatus such as the sound module 207 of the vehicle 101 and a steering wheel. When the second apparatus is the light module 206, the first state may be describing on/off, blinking, and luminance of the light, for example, turning on a low beam lamp, turning on and enhancing luminance of the low beam lamp. When the second apparatus is the sound module 207, the first state may be describing whether an exterior horn honks, and volume and content of an interior prompt tone, for example, an interior stereo plays a voice prompt of "The road ahead is wet and slippery, please slow down". That is, the control module 205 may obtain a plurality of pieces of first information. The first information may indicate information such as an environment, a road, light luminance, weather, a pedestrian, a map, a vehicle, and a traffic sign. The first state of the at least one second apparatus may be comprehensively determined by using the first information. The first information may also directly indicate the first state of the at least one second apparatus.

In one embodiment, the second apparatus may include an exterior illuminating lamp apparatus (such as headlamps or fog lamps), an exterior signal lamp apparatus (such as a turn signal or a brake lamp), an interior illuminating apparatus (such as illuminating lamps throughout the interior), an interior active noise cancellation apparatus (such as an active noise cancellation horn or a noise collection microphone), an interior visual cue apparatus (such as a dashboard indicator, a head-up display apparatus, or a screen), an interior auditory cue apparatus (such as interior horns or buzzers), and an interior tactile cue apparatus (such as a steering wheel vibration apparatus or a seat vibration apparatus).

S402: Determine a first state of at least one second apparatus based on the at least one piece of first information.

For example, the control module 205 receives the at least one piece of first information from the at least one first apparatus and determines the first state of the at least one second apparatus based on the at least one piece of first information. The second apparatus includes the light module 206 of the vehicle 101 and may further include the apparatus such as the sound module 207 of the vehicle 101, and the steering wheel. The first state may provide information (for example, a voice prompt of a road condition) to a driver or direct the driver's attention (for example, steering wheel vibration prompts to hold the steering wheel, or flashing high beams to illuminate a traffic sign), to assist the driver to properly drive the vehicle. Herein, an example in which the second apparatus is the light module 206 is used. The first state may be describing on/off, blinking, and luminance of the light. For example, the first state is turning on a low beam lamp, turning on and enhancing luminance of the low beam lamp. Because the light module includes a plurality of different light apparatuses, such as headlamps (high and low beams), side marker lamps, fog lamps, daytime running lamps, and turn signals, determining the first state of the light module is determining a combined state of the plurality of light apparatuses, for example, the first state may be that the headlamps are turned on, and the side marker lamps, fog lamps, daytime running lamps, and turn signals are off. Turning on the light may also extend a sensing range and capability of a sensor of the vehicle and/or the driver. For example, turning on the light may enable the driver and a visual sensor to observe an area that cannot be seen or sensed when the light is not turned on.

Optionally, the light apparatus may further include various indicators on the dashboard of the vehicle. The indicator on the dashboard of the vehicle may provide prompt information for the driver of the vehicle 101. The prompt information may include an operation prompt of an apparatus such as the stereo, the horn, the steering wheel, and the light module 206 of the vehicle 101. For example, when the first information received by the control module 205 is from a traffic sign on a road, and the traffic sign indicates that horns are not allowed on a road section ahead, after receiving the first information, the control module 205 determines the first state of the at least one second apparatus. The first state may be turning off an exterior horn apparatus and turning on a corresponding indicator on the dashboard of the vehicle to notify the driver of the vehicle 101 that horns are not allowed on this road section and that the exterior horn apparatus has been automatically turned off.

In a possible implementation, there is a correspondence between the at least one piece of first information and the first state of the at least one second apparatus, and the correspondence is preset. For example, the second apparatus is the light module 206 of the vehicle 101. For example, the first information is that ambient light luminance is relatively dark and there is a traffic sign 150 meters away from a driving road. In this case, the first state corresponding to the first information is that the high beam lamps in the light module of the vehicle are turned on. The first information is that there is a tunnel ahead of the driving road and all lights of the vehicle are not turned on. In this case, the first state corresponding to the first information is that the headlamps in the light module of the vehicle are turned on. The first information is that there is a tunnel ahead of the road and the daytime running lamps of the vehicle have been turned on. In this case, the first state corresponding to the first information is that the daytime running lamps in the light module of the vehicle are turned off and the headlamps are turned on. The first information is that there is an oncoming vehicle ahead of the road, ambient light luminance is relatively dark, and the headlamps of the vehicle are turned on as the high beam lamps. In this case, the first state corresponding to the first information may be that the high beam lamps in the light module of the vehicle are turned off and the side marker lamps are turned on. Optionally, the second apparatus may further include various indicators on the dashboard of the vehicle. When the first information is that a pedestrian moves ahead of or on a side of the driving road, the first state corresponding to the first information may be turning on the indicator on the dashboard of the vehicle, to prompt the driver of the vehicle 101 to let the pedestrian go first.

For example, the second apparatus is the sound module 207 of the vehicle 101. For example, the first information is information about whether there is a traffic light T intersection ahead, and a honk is recommended. In this case, the first state corresponding to the first information is that the interior horn in the sound module 207 of the vehicle 101 plays a voice prompt of "No traffic light T intersection ahead, drive with caution." The first information is information that the vehicle is about to enter a wet and slippery road section. In this case, the first state corresponding to the first information is that the interior horn in the sound module 207 of the vehicle 101 plays a voice prompt of "The road ahead is wet and slippery, please slow down."

In a possible implementation, because the control module 205 can receive the at least one piece of first information from the at least one first apparatus, a conflict may occur between first states corresponding to a plurality of pieces of first information. In a case in which the conflict may occur between the first states corresponding to the plurality of pieces of first information, different priorities of different first information may be preset, and the first state of the second apparatus is determined based on different priorities. For example, the vehicle 101 receives first information from a traffic sign to indicate that there is a traffic sign ahead of the road, and a first state corresponding to the first information is turning on the high beam lamps. In addition, the vehicle 101 receives first information from the vehicle 105, indicating that the vehicle 105 is about to meet with the vehicle 101. A first state corresponding to the first information is turning off the high beam lamps and turning on the side marker lamps. In this case, a conflict occurs between the two pieces of first information. If an information priority of vehicle meeting is preset to be greater than an information priority of a traffic sign, it is determined that the first state is turning off the high beam lamps and turning on the side marker lamps.

In a possible implementation, when a conflict may occur between the first states corresponding to the plurality of pieces of first information, not only different priorities of different first information may be preset, but also the first information may be preset to correspond to a plurality of states. For example, when the first information is that there is a traffic sign ahead of the road, the first state is turning on the high beam lamps. In addition, an alternative state may be preset that the interior horn plays a voice prompt of "There is a traffic sign ahead." When the first state corresponding to the first information cannot be executed due to the conflict, the alternative state may be enabled. For example, when the vehicle 101 receives the first information from the traffic sign to indicate that there is a traffic sign ahead of the road, the first state corresponding to the first information is turning on the high beam lamps. In addition, the vehicle 101 receives the first information from the vehicle 105, indicating that the vehicle 105 is about to meet with the vehicle 101. The first state corresponding to the first information is turning off the high beam lamps and turning on the side marker lamps. Because a conflict occurs between the first states corresponding to the two information, and the information priority of the vehicle meeting is preset to be greater than the information priority of the traffic sign, the first state corresponding to vehicle meeting information and the alternative state corresponding to traffic sign information are enabled, and it is determined that the first state is turning off the high beam lamps and turning on the side marker lamps, and the interior horn in the vehicle plays the voice prompt of "There is a traffic sign ahead."

In a possible implementation, the control module 205 determines the first state of the at least one second apparatus based on the at least one piece of first information and second information. The second information is from a terminal including the at least one second apparatus. When the second apparatus is the light module 206 and/or the sound module 207, the terminal including the second apparatus is the vehicle 101. The second information may include information such as environment information, hardware component information, and operating status information that are obtained by the sensor 208 of the vehicle 101. The environment information may include at least one of road information, light luminance information, weather information, pedestrian information, map information, vehicle information, and the like. The hardware component information may include at least one of tire pressure of the vehicle, music played by the interior horn, a component fault, and the like. The operating status information may include at least one of a motion status of the vehicle (for example, a current traveling speed, an acceleration, or a wheel angle), a network status (for example, network connection quality, or whether the network is under an attack), a component operating status (for example, a current operating status of a light, a horn, a radio, or a stereo, or whether the component is faulty), and current location information. The first state of the at least one second apparatus is determined by combining the first information and the second information. A state of the at least one second apparatus is comprehensively determined by using an operating status of the vehicle 101, so that a proper state of the at least one second apparatus can be more accurately determined. For example, the vehicle 101 receives first information from a roadside device, where the first information is information that the vehicle is about to enter a wet and slippery road section; and receives second information from a vehicle speed sensor of the vehicle 101, where the first information is that a vehicle speed exceeds a safe driving speed. In this case, the first information and the second information are comprehensively determined, and a corresponding first state is that the interior horn in the sound module 207 of the vehicle 101 plays the voice prompt of "The road ahead is wet and slippery, please slow down."

Optionally, information included in the operating status information is determined by using at least one sensor and/or an element status inside the vehicle 101. For example, the first information is sent by the roadside device 102 that there is a tunnel ahead of the driving road, and the operating status information is determined by an internal element of the vehicle 101 that all lights are not turned on. Based on the first information and the operating status information, it may be determined that the first state is that the headlamps are turned on, and other lights are not turned on. The first information is sent by the roadside device 102 that there is a tunnel 3 km ahead of the road, and the operating status information is determined by an internal element of the vehicle 101 that the daytime running lamps of the vehicle are turned on, and current vehicle location information from the sensor 207 of the vehicle 101. Based on the first information and the operating status information, it may be determined that the first state is turning off the daytime running lamps and turning on the headlamps. The first information is sent by the vehicle 105 that a vehicle is coming ahead of the road, and information sent by a light sensor of the vehicle 101 that ambient light luminance is relatively dark, and the operating status information is determined by an internal element of the vehicle 101 that the headlamps of the vehicle 101 are turned on as the high beam lamps. Based on the first information and the operating status information, it may be determined that the first state is turning off the high beam lamps and turning on the side marker lamps.

In a possible implementation, when the at least one piece of first information includes light luminance information, the light luminance information belongs to a first luminance range in a plurality of light luminance ranges, the plurality of light luminance ranges are defined by using at least one threshold, and the plurality of light luminance ranges has a correspondence with a light status of the second apparatus. The at least one threshold is predefined or preset. That is, the at least one threshold is predefined, the plurality of light luminance ranges are defined by using the at least one threshold, and the obtained light luminance information falls within one of the plurality of light luminance ranges. The threshold may be a threshold for defining upper and lower values of a range or may be a threshold for dividing a range.

For example, when the threshold is a threshold for dividing a light luminance range, two thresholds are defined as 3 and 6 respectively, and there are three light luminance ranges. A first range is 0 to 3 luminance units, a second range is 3 to 6 luminance units, and a third range is more than 6 luminance units. When light luminance indicated by the light luminance information falls within the first range, a corresponding light status is high beam lamps (or the light luminance is bright). When the light luminance indicated by the light luminance information falls within the second range, a corresponding light status is low beam lamps (or the light luminance is dark). When the light luminance indicated by the light luminance information falls within the third range, a corresponding light status is off (or the light luminance is none). Because there may be a correspondence between the light luminance information and the light status of the second apparatus, the light status of the second apparatus may be determined by using the light luminance information.

In another case, when the threshold is a threshold for defining upper and lower values of a range, thresholds for defining a first range are 0 to 3 luminance units, thresholds for defining a second range are 3 to 6 luminance units, and interference thresholds for defining a third range are 5 to 9 luminance units. Light luminance indicated by the light luminance information belongs to one of the three light luminance ranges. When the light luminance indicated by the light luminance information falls within the first range, a corresponding light status is high beam lamps (or the light luminance is bright). When the light luminance indicated by the light luminance information falls within the second range, a corresponding light status is low beam lamps (or the light luminance is dark). When the light luminance indicated by the light luminance information falls within the third range, a corresponding light status is off (or the light luminance is none).

If the light luminance information in the at least one piece of first information falls within the first luminance range, the light status of the second apparatus may be determined based on the at least one piece of first information, so that the light status of the second apparatus corresponds to the first luminance range. According to the correspondence between the plurality of light luminance ranges and the light status of the second apparatus and based on obtained different light luminance of an environment, different light statuses are determined, so that when the light luminance is insufficient or very strong, the light status does not need to be manually switched. This may save resources.

For the case in which the threshold is a threshold for defining upper and lower values of a range, because the three ranges partially overlap, if light luminance at a first moment is bright, light luminance information in the at least one piece of first information obtained by the control module 205 at a second moment is 3 luminance units. Although 3 also falls in the second range in which the light luminance is dark, it is preferred that a current status is not changed, that is, the light luminance at the second moment is still bright. This avoids frequent switching of light luminance and saves resources. Optionally, when the control apparatus 205 initially determines light luminance, because there is no previous light luminance reference, if light luminance information in the at least one piece of first information falls within an overlapping range, an interval range in which the light luminance is brighter or an interval range in which the light luminance is darker may be preset.

In a possible implementation, the control module 205 determines, based on the at least one piece of first information, that the at least one second apparatus is in the first state when a first condition is met. The first condition may be a location condition and a time condition. For example, after receiving the at least one piece of first information, the control module 205 needs to first determine whether the vehicle 101 meets a specific location condition and/or time condition, and if the vehicle 101 meets the specific location condition and/or time condition, it can be determined that the at least one second apparatus is in the first state.

For example, the first information is sent by the roadside device 102 that there is a tunnel 3 km ahead of the road, and the operating status information is determined by an internal element of the vehicle 101 that the daytime running lamps of the vehicle are turned on, and current vehicle location information sensed by the sensor 207 of the vehicle 101. Based on the first information and the operating status information, it may be determined that the first state is turning off the daytime running lamps and turning on the headlamps. However, because a current location of the vehicle is still some distance from the tunnel, if the daytime running lamps are turned off and the headlamps are turned on now, a current sight line of the driver of the vehicle 101 is affected, that is, the daytime running lamps do not need to be turned off and the headlamps do not need to be turned on immediately. The first condition may be a preset distance from the tunnel, or the first condition is a preset distance for driving again, or the first condition is a preset time for driving again. The preset time may be related to a ratio of a distance in the first information to a current average speed. In other words, the first condition may change with the first information. When determining, based on the at least one piece of first information, that the first condition is met, the control module 205 triggers the first state. For example, when the mileage sensor of the vehicle 101 records that the vehicle 101 travels a distance of 2950 meters again after receiving the first information, it is determined that the first state is turning off the daytime running lamps and turning on the headlamps.

Optionally, step S403: Send control information to the at least one second apparatus.

For example, after determining, based on the at least one piece of first information, the first state of the at least one second apparatus, the control module 205 sends the control information to the at least one second apparatus. The control information is used to indicate the first state of the at least one second apparatus.

In a possible implementation, after determining, based on the at least one piece of first information, the first state of the at least one second apparatus, the control module 205 sends the control information to the at least one second apparatus when the first condition is met. The first condition may be a location condition and a time condition. For example, the first information is sent by the roadside device 102 that there is a tunnel 3 km ahead of the road, and the operating status information is determined by an internal element of the vehicle 101 that the daytime running lamps of the vehicle are turned on, and current vehicle location information from the sensor 207 of the vehicle 101. Based on the first information and the operating status information, it may be determined that the first state is turning off the daytime running lamps and turning on the headlamps. Because a current location of the vehicle is still some distance from the tunnel, the daytime running lamps do not need to be turned off and the headlamps do not need to be turned on immediately. It is preset that the first condition may be a preset distance from the tunnel, or the first condition is a preset distance for driving again, or the first condition is a preset time for driving again. The preset time may be related to a ratio of a distance in the first information to a current average speed. When determining, based on the at least one piece of first information, that the first condition is met, the control module 205 sends the control information to the at least one second apparatus. For example, when the mileage sensor records that the vehicle 101 travels a distance of 2950 meters again after receiving the first information, the control module 205 sends the control information to the light module, to indicate that the first state is turning off the daytime running lamps and turning on the headlamps.

Optionally, when the control module 205 is the central controller or the control node of the vehicle 101, after step S402, the method may further include step S404: Send control information to at least one third apparatus.

For example, the third apparatus may be a controller that directly controls the at least one second apparatus. After determining the first state of the at least one second apparatus, the control module 205 sends the control information to the at least one third apparatus through a communications module. The control information is used to indicate the first state of the at least one second apparatus. After receiving the control information, the at least one third apparatus controls the at least one second apparatus based on the control information.

In a possible implementation, after determining, based on the at least one piece of first information, the first state of the at least one second apparatus, the control module 205 sends the control information to the at least one third apparatus when the first condition is met. The first condition may be a location condition and a time condition.

In the method described in FIG. 4, the control module 205 first receives the at least one piece of first information from the at least one first apparatus. The first apparatus may include the roadside device, the network device, or the first vehicle. The device determines the first state of the at least one second apparatus based on the received at least one piece of first information. The second apparatus may be an exterior illuminating and signal device such as a vehicle light or a horn. The first information may indicate a status such as on/off, blinking, luminance, and the like of the vehicle light, and may indicate honking of the exterior horn, prompt content of an interior prompt tone, and the like. The first state may provide information (for example, a voice prompt of a road condition) to a driver or direct the driver's attention (for example, steering wheel vibration prompts to hold a steering wheel, or flashing high beams to illuminate a traffic sign), to assist the driver to properly drive the vehicle. In this implementation, the first state of the at least one second apparatus is determined by using the first information from the roadside device, the network device, or the first vehicle, so that the at least one second apparatus can be automatically controlled, and a problem that based on ego vehicle sensing, an automatic control function of the at least one second apparatus is limited by a sensing range is resolved. At the same time, because a state of the second apparatus is controlled to change, the second apparatus may also extend a sensing range and capability of a sensor of the vehicle and/or the driver, for example, turning on the light may enable the driver and a visual sensor to observe an area that cannot be seen when the light is not turned on, and also has a function of prompting another vehicle sensor and another driver of existence of the vehicle and a location of the vehicle.

The following describes the control method in the embodiments based on the foregoing control system and application scenario by using a first apparatus as an execution body. The first apparatus may include the roadside device 102, the pedestrian 103, the network device 104, and the vehicle 105 in FIG. 1. The first apparatus sends status indication information to the vehicle 105. The status indication information is used to indicate a first state of at least one second apparatus, and the vehicle 105 includes the at least one second apparatus. The first state of the second apparatus may be directly determined by using the status indication information. Herein, that the first apparatus is the roadside device 102 is used as an example. The roadside device 102 may generate or store information such as a road, a map, or a traffic sign in advance, or obtain environment information based on the sensing module 202 of the roadside device. The environment information may include road information, light luminance information, weather information, pedestrian information, map information, vehicle information, traffic sign information, and the like. After the obtained environment information is processed by the processing module 203, the roadside device obtains the status indication information, and sends the status indication information to the at least one second apparatus through the communications module 201, to directly indicate the first state of the at least one second apparatus. When the at least one second apparatus is the light module 206 of the vehicle 101, the status indication information may be turning on the headlamps, and not turning on other lights, may be turning off the daytime running lamps and turning on the headlamps, or the like.

Optionally, the first apparatus may be powered by using a battery.

Based on the foregoing provided control method, an application scenario is further provided in detail below for specific implementation description of the foregoing method.

Figure 5:
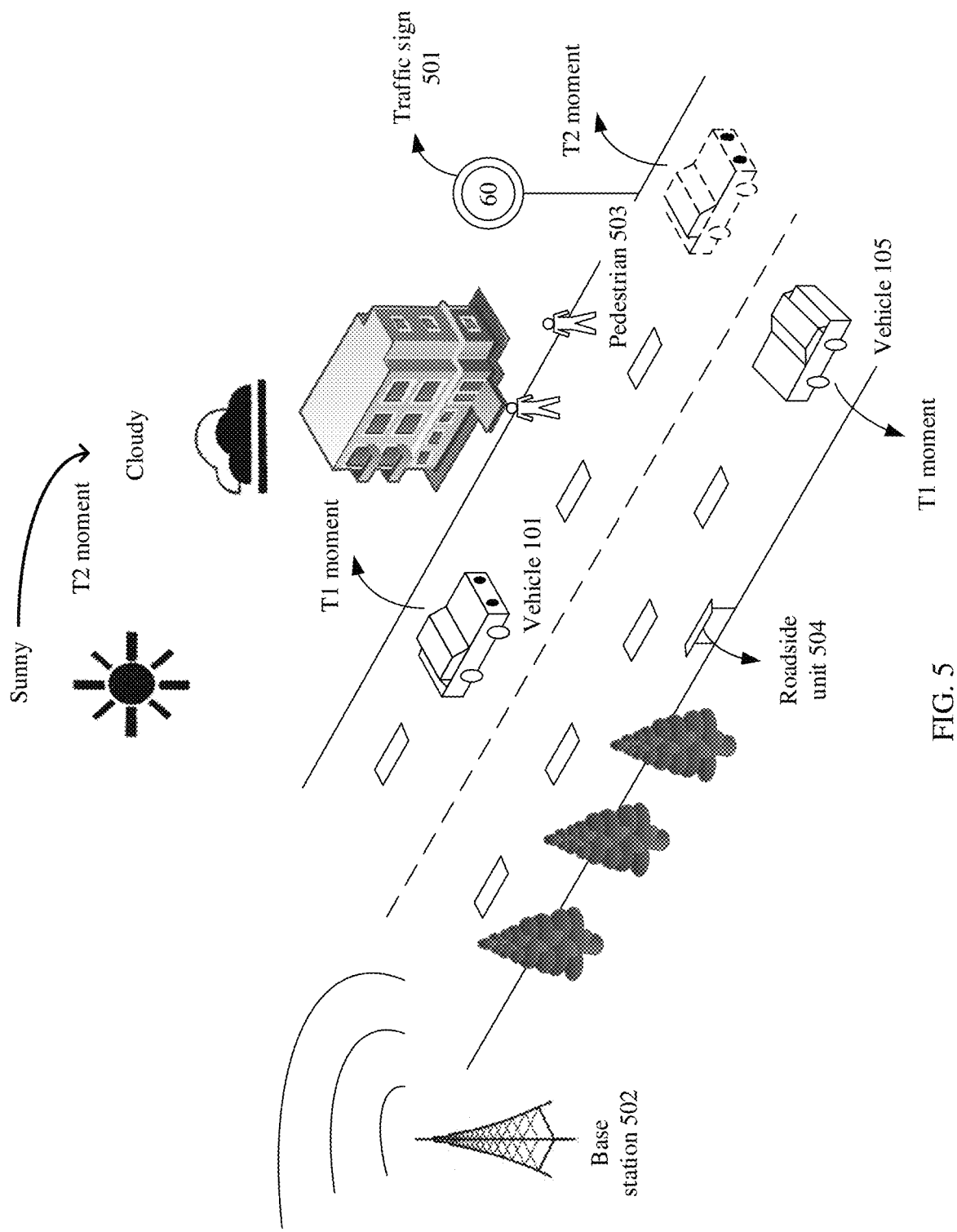
FIG. 5 is a schematic diagram of an application scenario of still another control method according to an embodiment.

An application scenario of this embodiment is shown in FIG. 5. At a moment T1, weather is sunny, and the vehicle 101 receives first information from a traffic sign 501, prompting the vehicle 101 to pay attention to a traffic sign in front of the vehicle. A first state may be turning on high beam lamps. For example, the vehicle 101 may receive first information from a communications module on the traffic sign. The vehicle 101 further receives first information sent by the roadside unit 504, prompting the vehicle 101 to note that there are two pedestrians 503 in front of the vehicle. The first state may be turning on daytime running lamps. In addition, the vehicle 101 further receives first information sent by the vehicle 105, prompting the vehicle 101 to note that a vehicle is coming. The first state may be turning on low beam lamps. In this case, operating status information of the vehicle 101 is determined by an internal element of the vehicle 101 that all lights of the vehicle are not turned on. Based on a plurality of pieces of first information and the operating status information, a control module of the vehicle 101 comprehensively determines that the first state may be that the daytime running lamps are turned on based on a preset priority, and other lights are not turned on, and an interior stereo outputs voice prompt information of "Please pay attention to the pedestrian, the vehicle, and the traffic sign". At a moment T2, the weather changes from sunny to cloudy, and the vehicle 101 receives first information sent by the roadside unit 504 or receives first information sent by a light sensor of the vehicle 101, prompting the vehicle 101 that ambient light is insufficient. In this case, the operating status information of the vehicle 101 is determined by the internal element of the vehicle 101 that the daytime running lamps of the vehicle are turned on, and other lights are turned off. It may be determined that the first state is that the daytime running lamps are turned off and headlamps are turned on.

The method in the embodiments is described in detail above, and apparatuses in the embodiments are provided below.

Figure 6:
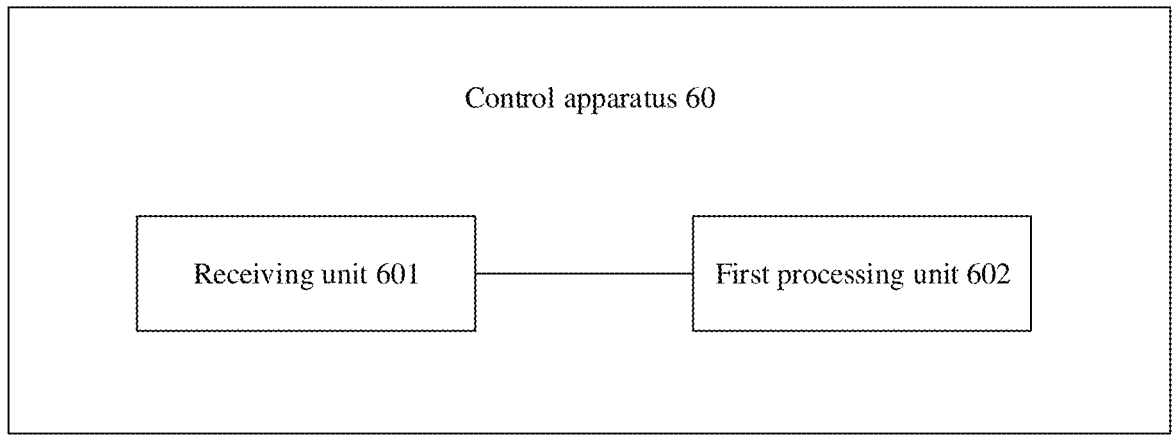
FIG. 6 is a schematic diagram of a control apparatus according to an embodiment.

FIG. 6 is a schematic diagram of a structure of a control apparatus according to an embodiment. The control apparatus may include a receiving unit 601 and a first processing unit 602 and may further include a first sending unit 603. Each unit is described in detail below.

The receiving unit 601 is configured to receive at least one piece of first information from at least one first apparatus. The at least one first apparatus includes at least one of a roadside device, a network device, and a second apparatus.

The first processing unit 602 is configured to determine a first state of at least one second apparatus based on the at least one piece of first information.

In a possible implementation, the apparatus further includes: a first sending unit 603, configured to send control information to the at least one second apparatus, where the control information is used to indicate the first state of the at least one second apparatus.

In a possible implementation, the apparatus further includes: the first sending unit 603, further configured to send control information to at least one third apparatus, where the control information is used to indicate the first state of the at least one second apparatus.

In a possible implementation, there is a correspondence between the at least one piece of first information and the first state of the at least one second apparatus, and the correspondence is preset.

In a possible implementation, the first processing unit 602 is configured to determine the first state of the at least one second apparatus based on the at least one piece of first information and second information. The second information is from a terminal including the at least one second apparatus.

In a possible implementation, the second information includes operating status information of the terminal, and the operating status information includes at least one of a motion status, a network status, a component operating status, and current location information.

In a possible implementation, information included in the second information is determined by using at least one sensor and/or an element status inside the terminal.

In a possible implementation, the second apparatus includes at least one of the following: an exterior illuminating lamp apparatus; an exterior signal lamp apparatus; an interior illuminating apparatus; an interior active noise cancellation apparatus; an interior visual cue apparatus; an interior auditory cue apparatus; and an interior tactile cue apparatus.

In a possible implementation, the at least one piece of first information includes environment information and/or status indication information. The environment information includes at least one of the following: road information; light luminance information; weather information; pedestrian information; map information; vehicle information; and traffic sign information. The status indication information is used to indicate the first state of the at least one second apparatus.

In a possible implementation, the light luminance information belongs to a first luminance range in a plurality of light luminance ranges, the plurality of light luminance ranges is defined by using at least one threshold, and the plurality of light luminance ranges corresponds with a light status of the second apparatus. The first processing unit 602 is configured to: if the light luminance information in the at least one piece of first information falls within the first luminance range, determine the light status of the second apparatus based on the at least one piece of first information, so that the light status of the second apparatus corresponds to the first luminance range.

In a possible implementation, the at least one threshold is predefined or preset.

In a possible implementation, the first processing unit 602 is configured to determine, based on the at least one piece of first information, that the at least one second apparatus is in the first state when a first condition is met.

In a possible implementation, the first sending unit 603 is configured to send at least one piece of control information to the at least one second apparatus when the first condition is met.

In a possible implementation, the first sending unit 603 is configured to send at least one piece of control information to at least one third apparatus when the first condition is met.

It should be noted that, for implementation of each unit, refer to corresponding descriptions of steps S401 to S403 in the method embodiment shown in FIG. 4. Details are not described herein again.

Figure 7:
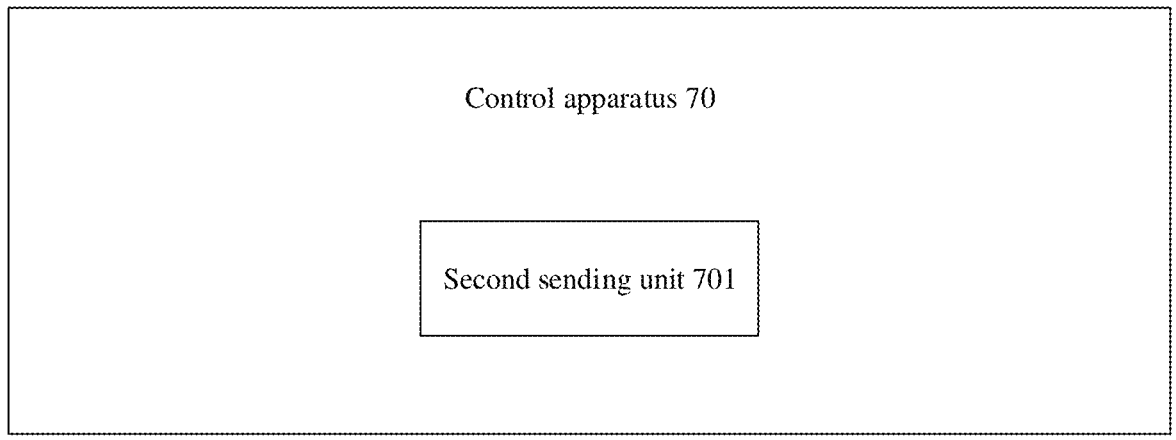
FIG. 7 is a schematic diagram of another control apparatus according to an embodiment.

FIG. 7 is a schematic diagram of a structure of a control apparatus according to an embodiment. The control apparatus may include a second sending unit 701. The second sending unit 701 is configured to send status indication information to a terminal. The status indication information is used to indicate a first state of at least one second apparatus. A first apparatus includes a roadside device, a network device, or a first vehicle, and the terminal includes the at least one second apparatus.

In a possible implementation, the apparatus further includes: a second processing unit 702, configured to: before sending the status indication information to the terminal, determine the status indication information based on obtained environment information. The environment information includes at least one of road information, light luminance information, weather information, pedestrian information, map information, vehicle information, and traffic sign information.

It should be noted that, for implementation of each unit, refer to a corresponding description of step S404 in the method embodiment shown in FIG. 4. Details are not described herein again. In addition, the foregoing first processing unit and second processing unit may be merely a logical distinction based on a function, and it is not limited that there are necessarily two independent processing units. In specific implementation, there may be one processing unit, or there may be a plurality of processing units.

Figure 8:
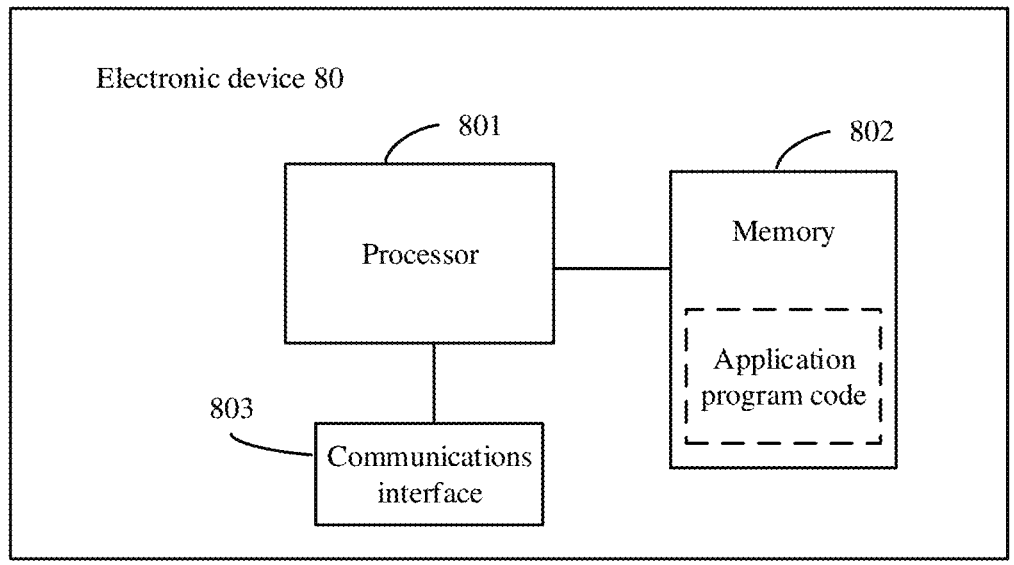
FIG. 8 is a schematic diagram of a structure of an electronic device according to an embodiment.

FIG. 8 is a schematic diagram of a structure of an electronic device according to an embodiment. The electronic device 80 includes at least one processor 801 and at least one communications interface 803. Optionally, the electronic device 80 may further include at least one memory 802. In addition, the device may further include universal components such as an antenna. Details are not described herein again.

The processor 801 may be a general-purpose central processing unit (CPU), a microprocessor, an application-specific integrated circuit (ASIC), or one or more integrated circuits for controlling execution of the foregoing solution program.

The apparatus includes the communications interface 803, and the communications interface is configured to communicate with another device or a communications network, such as an Ethernet, a radio access network (RAN), a core network, or a wireless local area network (WLAN).

If the apparatus includes the memory 802, the memory may be a read-only memory (ROM) or another type of static storage device capable of storing static information and instructions, a random access memory (RAM) or another type of dynamic storage device capable of storing information and instructions. Alternatively, the memory may be an electrically erasable programmable read-only memory (EEPROM), a compact disc read-only memory (CD-ROM) or another compact disc storage, optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or a data structure and capable of being accessed by a computer. However, this is not limited thereto. The memory may exist independently and is connected to the processor through the bus. The memory may alternatively be integrated with the processor.

The memory 802 is configured to store application program code for executing the foregoing solutions, and the processor 801 controls the execution. The processor 801 is configured to execute the application program code stored in the memory 802.

The code stored in the memory 802 may be configured to execute the control method provided in FIG. 4, for example, receive at least one piece of first information from at least one first apparatus, where the at least one first apparatus includes at least one of a roadside device, a network device, and a first vehicle; and determine a first state of at least one second apparatus based on the at least one piece of first information.

The electronic device 80 may be a central controller or a control node in a vehicle. The central controller or the control node may directly control the at least one second apparatus in the vehicle or may control the at least one second apparatus by controlling a direct control apparatus of the at least one second apparatus.

Optionally, the electronic device 80 may alternatively be the direct control apparatus of the at least one second apparatus in the vehicle and receives control instructions sent by the central controller or the control node, to control the at least one second apparatus.

Optionally, the electronic device 80 may alternatively be a second apparatus with a communications module, and receive instructions sent by another device, so that the second apparatus reaches a corresponding state.

Optionally, the electronic device 80 may alternatively be a first apparatus. Optionally, the first apparatus may be powered by using a battery.

Optionally, the electronic device 80 may alternatively be a chip or an integrated circuit.

Optionally, the electronic device 80 may alternatively be integrated into an in-vehicle central controller or an MDC controller.

It should be noted that, for functions of function units in the electronic device 80 described in this embodiment, refer to related descriptions of step S401 to step S404 in the method embodiment in FIG. 4. Details are not described herein again.

An embodiment further provides a vehicle, and the foregoing electronic device is disposed on the vehicle. Further optionally, the vehicle includes the at least one second apparatus.

Figure 9:
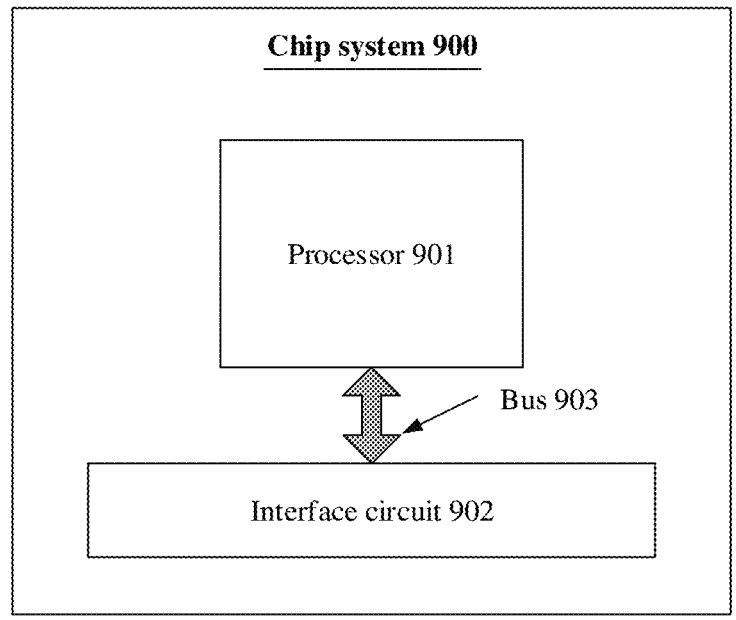
FIG. 9 is a schematic diagram of a structure of a chip system according to an embodiment.

As shown in FIG. 9, an embodiment further provides a chip system 900, including one or more processors 901 and an interface circuit 902. Optionally, the chip system 900 may further include a bus 903.

The processor 901 may be an integrated circuit chip and has a signal processing capability. In an implementation process, steps in the foregoing methods can be implemented by a hardware integrated logical circuit in the processor 901, or by instructions in a form of software. The processor 901 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 901 may implement or perform the methods and steps described in the embodiments. The general-purpose processor may be a microprocessor, or the processor may be any conventional processor or the like.

The interface circuit 902 may send or receive data, instructions, or information. The processor 901 may process data, instructions, or other information received through the interface circuit 902, and send, through the interface circuit 902, information obtained after processing.

Optionally, the chip system further includes a memory. The memory may include a read-only memory and a random access memory and provide operation instructions and data for the processor. A part of the memory may further include a nonvolatile random access memory (NVRAM).

Optionally, the memory stores an executable software module or a data structure, and the processor may perform a corresponding operation by invoking operation instructions (the operation instructions may be stored in an operating system) stored in the memory.

Optionally, the chip system may be used in user equipment or the network device in the embodiments. Optionally, the interface circuit 902 may be configured to output an execution result of the processor 901. For the resource reservation method provided in one or more embodiments, refer to the foregoing embodiments. Details are not described herein again.

It should be noted that functions corresponding to each of the processor 901 and the interface circuit 902 may be implemented by using a hardware design, may be implemented by using a software design, or may be implemented by combining software and hardware. This is not limited herein.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, persons skilled in the art should appreciate that this embodiment is not limited to the described order of the actions, because some steps may be performed in other orders or simultaneously. It should be further appreciated by persons skilled in the art that the embodiments all belong to embodiments, and the involved actions and modules are not necessarily required.

In the several embodiments, it should be understood that the described apparatuses may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit. The integrated unit may be implemented in a form of hardware or may be implemented in a form of a software function unit.

When the foregoing integrated unit is implemented in the form of the software function unit and sold or used as an independent product, the integrated unit may be stored in a computer-readable storage medium. Based on such an understanding, all or some of the solutions may be implemented in a form of a software product. The computer software product is stored in a storage medium and includes several instructions for instructing a computer device (which may be a personal computer, a server, or a network device, and may be a processor in the computer device) to perform all or some of the steps of the methods described in the embodiments. The foregoing storage medium may include any medium that can store program code, such as a USB flash drive, a removable hard disk, a magnetic disk, an optical disc, a read-only memory (ROM), or a random access memory (RAM).

Persons of ordinary skill in the art may understand that all or some of the procedures of the methods in the embodiments may be implemented by a computer program instructing related hardware. The program may be stored in a computer-readable storage medium. When the program is executed, the procedures of the methods in the embodiments may be performed. The foregoing storage medium includes any medium that can store program code, such as a ROM, a random access memory (RAM), a magnetic disk, or an optical disc.

What is claimed is:

1. A control method comprising:
receiving, in a control apparatus of a vehicle, at least one piece of first information from at least one first apparatus, wherein the at least one first apparatus comprises at least one of a roadside device, a network device, or a first vehicle;
determining, in the control apparatus of a vehicle, a first state of at least one second apparatus, wherein the at least one second apparatus comprises at least one of a light module or a sound module in a vehicle, based on the at least one piece of first information; and
implement, in the control apparatus of a vehicle, automatic control of the at least one second apparatus.

2. The control method according to claim 1, further comprising:
sending control information to the at least one second apparatus, wherein the control information is used to indicate the first state of the at least one second apparatus.

3. The control method according to claim 1, further comprising:
sending control information to at least one third apparatus, wherein the control information is used to indicate the first state of the at least one second apparatus.

4. The control method according to claim 1, wherein there is a correspondence between the at least one piece of first information and the first state of the at least one second apparatus, and the correspondence is preset.

5. The control method according to claim 1, wherein determining the first state of the at least one second apparatus based on the at least one piece of first information further comprises:
determining the first state of the at least one second apparatus based on the at least one piece of first information and second information, wherein the second information is from a terminal comprising the at least one second apparatus.

6. The control method according to claim 5, wherein the second information comprises operating status information of the terminal, and the operating status information comprises at least one of a motion status, a network status, a component operating status, and current location information.

7. The control method according to claim 5, further comprising:
determining information comprised in the second information by using at least one of a sensor and an element status inside the terminal.

8. The control method according to claim 1, wherein the at least one second apparatus comprises at least one of the following:
an exterior illuminating lamp apparatus;
an exterior signal lamp apparatus;
an interior illuminating apparatus;
an interior active noise cancellation apparatus;
an interior visual cue apparatus;
an interior auditory cue apparatus; and
an interior tactile cue apparatus.

9. The control method according to claim 1, wherein the at least one piece of first information comprises environment information and/or status indication information, wherein the environment information comprises at least one of the following:
road information;
light luminance information;
weather information;
pedestrian information;
map information;
vehicle information; and
traffic sign information; and
the status indication information is used to indicate the first state of the at least one second apparatus.

10. The control method according to claim 9, wherein the light luminance information belongs to a first luminance range in a plurality of light luminance ranges, the plurality of light luminance ranges is defined by using at least one threshold, and the plurality of light luminance ranges corresponds with a light status of the at least one second apparatus; and determining the first state of the at least one second apparatus based on the at least one piece of first information further comprises:
when the light luminance information in the at least one piece of first information falls within the first luminance range, determining the light status of the at least one second apparatus based on the at least one piece of first information, wherein the light status of the at least one second apparatus corresponds to the first luminance range.

11. The control method according to claim 10, wherein the at least one threshold is predefined or preset.

12. The control method according to claim 1, wherein determining the first state of the at least one second apparatus based on the at least one piece of first information further comprises:
determining, based on the at least one piece of first information, that the at least one second apparatus is in the first state when a first condition is met.

13. The control method according to claim 2, wherein sending the control information to the at least one second apparatus, wherein the control information is used to indicate the first state of the at least one second apparatus further comprises:
sending at least one piece
of control information to the at least one second apparatus when a first condition is met.

14. The control method according to claim 3, wherein sending the control information to at least one third apparatus, wherein the control information is used to indicate the first state of the at least one second apparatus further comprises:
sending at least one piece of control information to the at least one third apparatus when a first condition is met.

15. A control method, applied to a first apparatus, the method comprising:
sending status indication information from a first apparatus to a terminal, wherein the status indication information is used to indicate a first state of at least one second apparatus, wherein the first apparatus comprises a roadside device, a network device, or a first vehicle, and the terminal comprises the at least one second apparatus.

16. The control method according to claim 15, wherein, before sending the status indication information to the terminal, the method further comprises:
determining the status indication information based on obtained environment information, wherein the environment information comprises at least one of road information, light luminance information, weather information, pedestrian information, map information, vehicle information, and traffic sign information.

17. A control apparatus in a vehicle comprising:
one or more processors, and
a non-transitory storage medium in communication with the one or more processors, the non-transitory storage medium configured to store program instructions, wherein, when executed by the one or more processors, the instructions cause the apparatus to:
receive, in the control apparatus, at least one piece of first information from at least one first apparatus, wherein the at least one first apparatus comprises at least one of a roadside device, a network device, and a first vehicle; and
determine, in the control apparatus, a first state of at least one second apparatus wherein the at least one second apparatus comprises at least one of a light module or a sound module in a vehicle, based on the at least one piece of first information implement, in the control apparatus, automatic control of the at least one second apparatus.

18. The control apparatus according to claim 17, wherein the instructions further cause the apparatus to:

send control information to the at least one second apparatus, wherein the control information is used to indicate the first state of the at least one second apparatus.

19. The control apparatus according to claim 17, wherein the instructions further cause the apparatus to:

send control information to at least one third apparatus, wherein the control information is used to indicate the first state of the at least one second apparatus.

20. The control apparatus according to claim 17, wherein there is a correspondence between the at least one piece of first information and the first state of the at least one second apparatus, and the correspondence is preset.

\* \* \* \* \*